US009100697B1

(12) United States Patent
Lee (10) Patent No.: US 9,100,697 B1
(45) Date of Patent: Aug. 4, 2015

(54) INTELLIGENT FULL WINDOW WEB BROWSER TRANSPARENCY

(75) Inventor: Felix Lee, Portland, OR (US)

(73) Assignee: GOOGLE INC., Mountain View, CA (US)

(*) Notice: Subject to any disclaimer, the term of this patent is extended or adjusted under 35 U.S.C. 154(b) by 528 days.

(21) Appl. No.: 13/460,124

(22) Filed: Apr. 30, 2012

(51) Int. Cl.
*H04N 21/00* (2011.01)
*H04N 21/462* (2011.01)

(52) U.S. Cl.
CPC .................... *H04N 21/4622* (2013.01)

(58) Field of Classification Search
CPC .......... H04N 21/4622; H04N 5/44504; H04N 5/44591
USPC .................................................. 715/234, 235
See application file for complete search history.

(56) References Cited

U.S. PATENT DOCUMENTS

| | | | | |
|---|---|---|---|---|
| 7,257,771 | B2* | 8/2007 | Buser et al. | 715/239 |
| 7,673,251 | B1* | 3/2010 | Wibisono | 715/771 |
| 7,974,957 | B2* | 7/2011 | Xie et al. | 707/694 |
| 8,046,795 | B2* | 10/2011 | Nguyen | 725/43 |
| 2002/0069411 | A1* | 6/2002 | Rainville et al. | 725/37 |
| 2002/0156679 | A1* | 10/2002 | Castle | 705/14 |
| 2005/0268228 | A1* | 12/2005 | Buser et al. | 715/523 |
| 2006/0015571 | A1* | 1/2006 | Fukuda et al. | 709/217 |
| 2006/0168127 | A1* | 7/2006 | Kelly | 709/219 |
| 2006/0230344 | A1* | 10/2006 | Jennings et al. | 715/522 |
| 2007/0150612 | A1* | 6/2007 | Chaney et al. | 709/231 |
| 2008/0177994 | A1* | 7/2008 | Mayer | 713/2 |
| 2009/0132900 | A1* | 5/2009 | Zielke | 715/201 |
| 2009/0138810 | A1* | 5/2009 | Howard et al. | 715/760 |
| 2010/0169837 | A1* | 7/2010 | Hyndman | 715/848 |
| 2011/0167360 | A1* | 7/2011 | Aitken et al. | 715/760 |
| 2011/0185287 | A1* | 7/2011 | Dharmarajan et al. | 715/752 |
| 2011/0258562 | A1* | 10/2011 | Zhu et al. | 715/760 |
| 2012/0011454 | A1* | 1/2012 | Droz et al. | 715/758 |
| 2012/0102428 | A1* | 4/2012 | Stewart | 715/781 |

* cited by examiner

*Primary Examiner* — Stephen Hong
*Assistant Examiner* — Marshon Robinson
(74) *Attorney, Agent, or Firm* — Sterne, Kessler, Goldstein & Fox, P.L.L.C.

(57) ABSTRACT

Disclosed herein are methods, systems, and computer readable storage media for rendering web pages with partial transparency. In response to a user request for a web page, the user-desired web page is retrieved. One or more content elements of the retrieved web page are analyzed to identify background elements and foreground elements. The web page is analyzed to determine whether transparency is appropriate for background elements. If transparency is appropriate, the background elements are rendered as at least partially transparent, such that a wallpaper is at least partially visible to a user through the background elements, and the foreground elements are rendered as opaque. If transparency is not appropriate, the foreground and background elements of the web page are rendered as opaque.

21 Claims, 7 Drawing Sheets

INTELLIGENT FULL WINDOW WEB BROWSER TRANSPARENCY

BACKGROUND

Operating systems typically allow users the ability to set images or patterns as their desktop wallpaper or desktop picture. These images may be included with the operating system, or specified by the user. Application windows may obscure a portion of or the entire desktop wallpaper.

BRIEF SUMMARY

Embodiments described below include methods, systems, and computer program products for rendering web pages with partial transparency. A method in accordance with an embodiment includes retrieving a user-desired web page in response to a user request for the web page. One or more content elements of the retrieved web page are analyzed to identify one or more background elements and one or more foreground elements of the web page. A determination is made as to whether transparency is appropriate for background elements of the retrieved web page, based on the analyzing. When it is determined that transparency is appropriate, identified background elements are rendered as at least partially transparent, such that a wallpaper is at least partially visible to a user through the identified background elements. Identified foreground elements are rendered as opaque when transparency is determined to be appropriate. When it is determined that transparency is not appropriate, identified background elements and identified foreground elements are rendered as opaque.

A system, in accordance with an embodiment, includes a processor. The system also includes a web browser, implemented on the processor. The web browser is configured to retrieve a user-desired web page in response to a user request for the web page. The web browser further analyzes one or more content elements of the retrieved web page to identify one or more background elements of the web page and one or more foreground elements of the web page. Based on the analyzing, the web browser is further configured to determine whether transparency is appropriate for background elements of the retrieved web page. If transparency is appropriate, identified background elements are rendered as at least partially transparent, such that a wallpaper is at least partially visible to a user through the identified background elements. Further, identified foreground elements are rendered as opaque. If transparency is not appropriate, the identified background elements and foreground elements are rendered as opaque.

In accordance with an embodiment, a computer readable storage medium having instructions stored thereon is disclosed. The instructions, when executed by a processor, cause the processor to perform operations including retrieving a user-desired web page in response to a user request for the web page. One or more content elements of the retrieved web page are analyzed to identify one or more background elements and one or more foreground elements of the web page. A determination is made as to whether transparency is appropriate for background elements of the retrieved web page, based on the analyzing. When it is determined that transparency is appropriate, the instructions further cause the processor to render identified background elements as at least partially transparent, such that a wallpaper is at least partially visible to a user through the identified background elements. Identified foreground elements are rendered as opaque when transparency is determined to be appropriate. When it is determined that transparency is not appropriate, identified background elements and identified foreground elements are rendered as opaque.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Many users customize various elements of their computers to their own liking. In particular, a large number of computer users assign personal pictures to be set as the desktop wallpaper or desktop picture (hereinafter "wallpaper" or "desktop wallpaper") of their operating system. The desktop wallpaper may span the user's entire monitor or other display, and may span multiple monitors as well. A wallpaper or desktop wallpaper also refers to an image or pattern used as a background of a graphical user interface of a computing device, such as a graphical user interface on a desktop computer, laptop computer, tablet computer, mobile communication device, smartphone, PDA, or other such computing device. For example, some tablet computers and other mobile communication devices allow users to set images for the "home" screen of the device.

As a computer user opens and uses various applications on their computer, application windows may partially or entirely obscure the desktop wallpaper. Once a user minimizes or closes one or more application window, she may be able to view her desktop wallpaper again. However, as users often select their desktop wallpapers for personal or aesthetic reasons, they may prefer to be able to view their desktop wallpaper at all times.

To view a desktop wallpaper while using an application, an application may have the ability to become partially transparent. For example, the application window may appear translucent such that the desktop wallpaper appears visible in the application window. However, depending on how transparency is implemented by the application, user interface elements, or content elements, may become difficult to view. Further, application transparency may not differentiate between elements of the application window that are interesting to the user and elements that can be transparent. For example, text content may be unreadable if an application is displayed as partially transparent.

Figure 1:
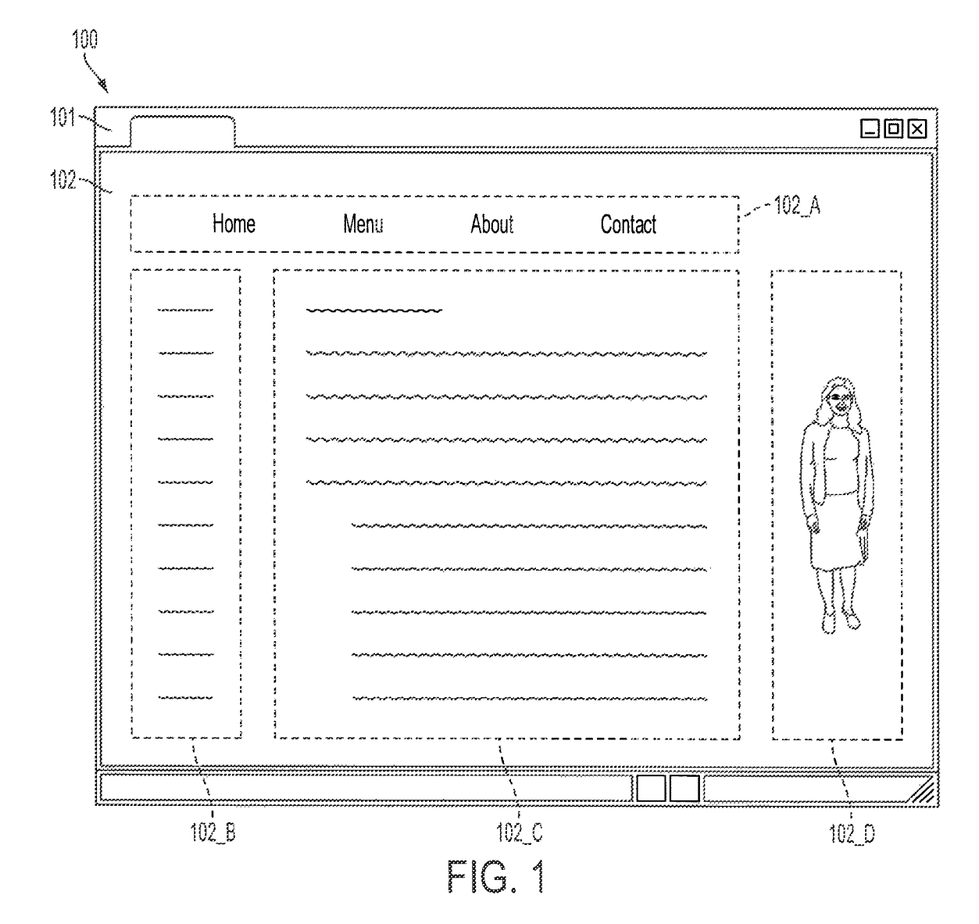
FIG. 1 is a diagram of a web browser window.

FIG. 1 is an illustration of an example web browser window 100. Web browser window 100 may include browser user interface elements, such as a tab bar area 101. Other user interface elements may be included in web browser window 100, but are not displayed in FIG. 1. Web browser window 100 may display web page 102. Web page 102 includes one or more content elements 102_A through 102_D.

Content element 102_A may be a menu area or navigational area repeated on multiple web pages related to web page 102. Content element 102_B may be a text area also repeated on multiple web pages related to web page 102. Content element 102_C may be a text area specific to web page 102, such as a page describing a restaurant or other establishment. Content element 102_D may be an image specific to web page 102.

Figure 2A:
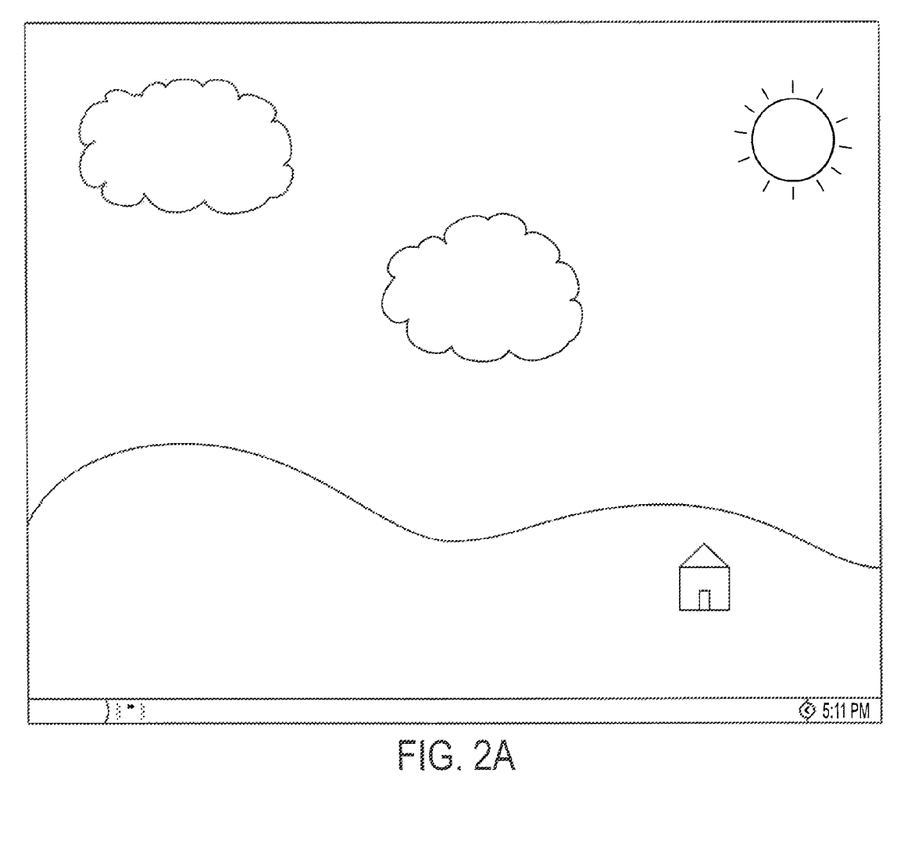
FIG. 2A is a diagram of a desktop wallpaper.

FIG. 2A is an example of a user's desktop wallpaper 201. Desktop wallpaper 201 may be an image selected by a user or a default image provided with an operating system. In FIG. 2A, application windows may all be minimized or hidden from the user, or not opened yet, as if a user has just started his or her computer. The desktop wallpaper of FIG. 2A features two clouds, a sun, a hillside, and a small building.

Figure 2B:
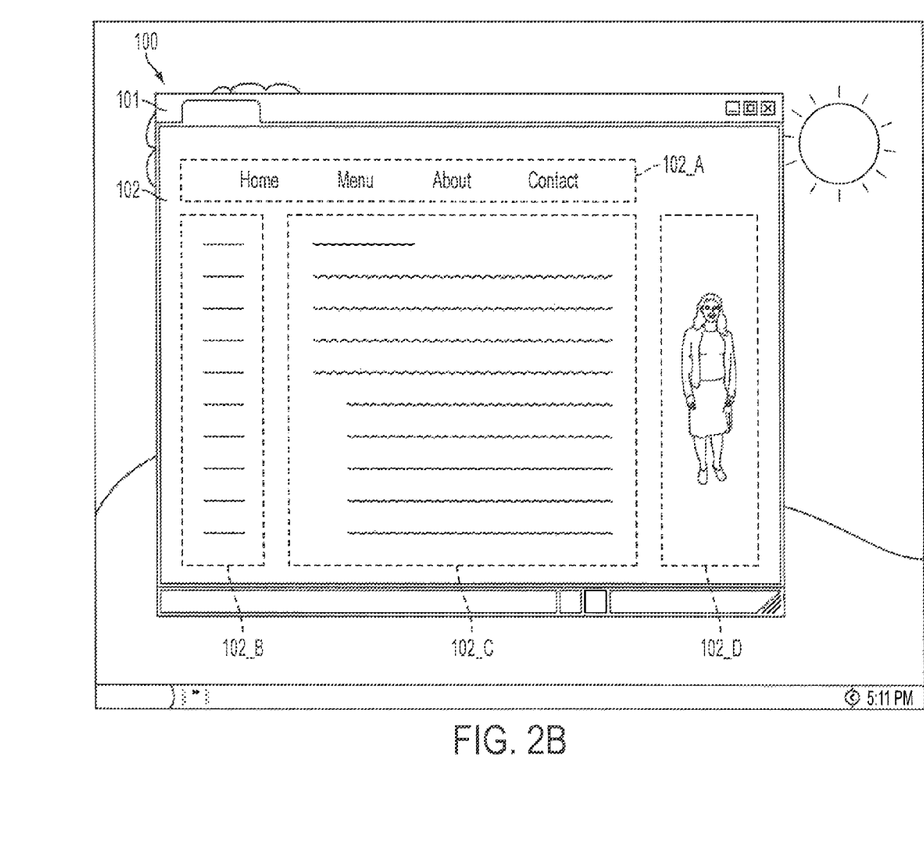
FIG. 2B is a diagram of a desktop wallpaper with a web browser window in accordance with an embodiment.

FIG. 2B is a diagram of a user's desktop wallpaper, with web browser window 100 displaying web page 102 on top of the user's desktop wallpaper, in accordance with an embodiment. As seen in FIG. 2B, web browser window 100 obscures portions of the user's desktop wallpaper, such as one of the clouds, a portion of another cloud, and part of the hillside.

Figure 2C:
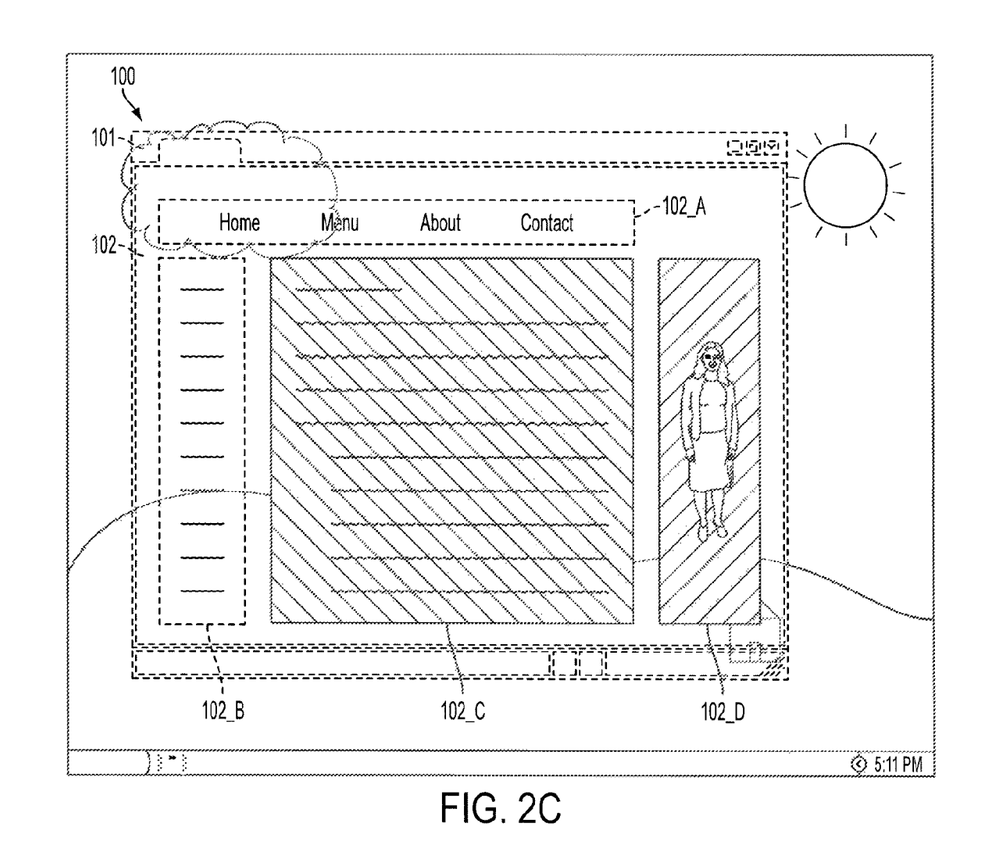
FIG. 2C is a diagram of a desktop wallpaper with a web browser window in accordance with an embodiment.

FIG. 2C is a diagram of a user's desktop wallpaper with web browser window 100 displaying web page 102 on top of the user's desktop wallpaper, in accordance with an embodiment. As depicted by the dashed lines, user interface elements of web browser window 100, such as tab bar 101, may become partially transparent such that the user's desktop wallpaper can be seen beneath the user interface elements. Similarly, in accordance with an embodiment, background content elements of web page 102, such as content elements 102_A and 102_B, may also become partially transparent. For example, the large cloud in the upper left corner of the user's desktop wallpaper 201 can be seen beneath content element 102_A. Foreground content elements 102_C and 102_D remain opaque, and the user's desktop wallpaper cannot be seen beneath foreground content elements 102_C and 102_D.

Figure 3:
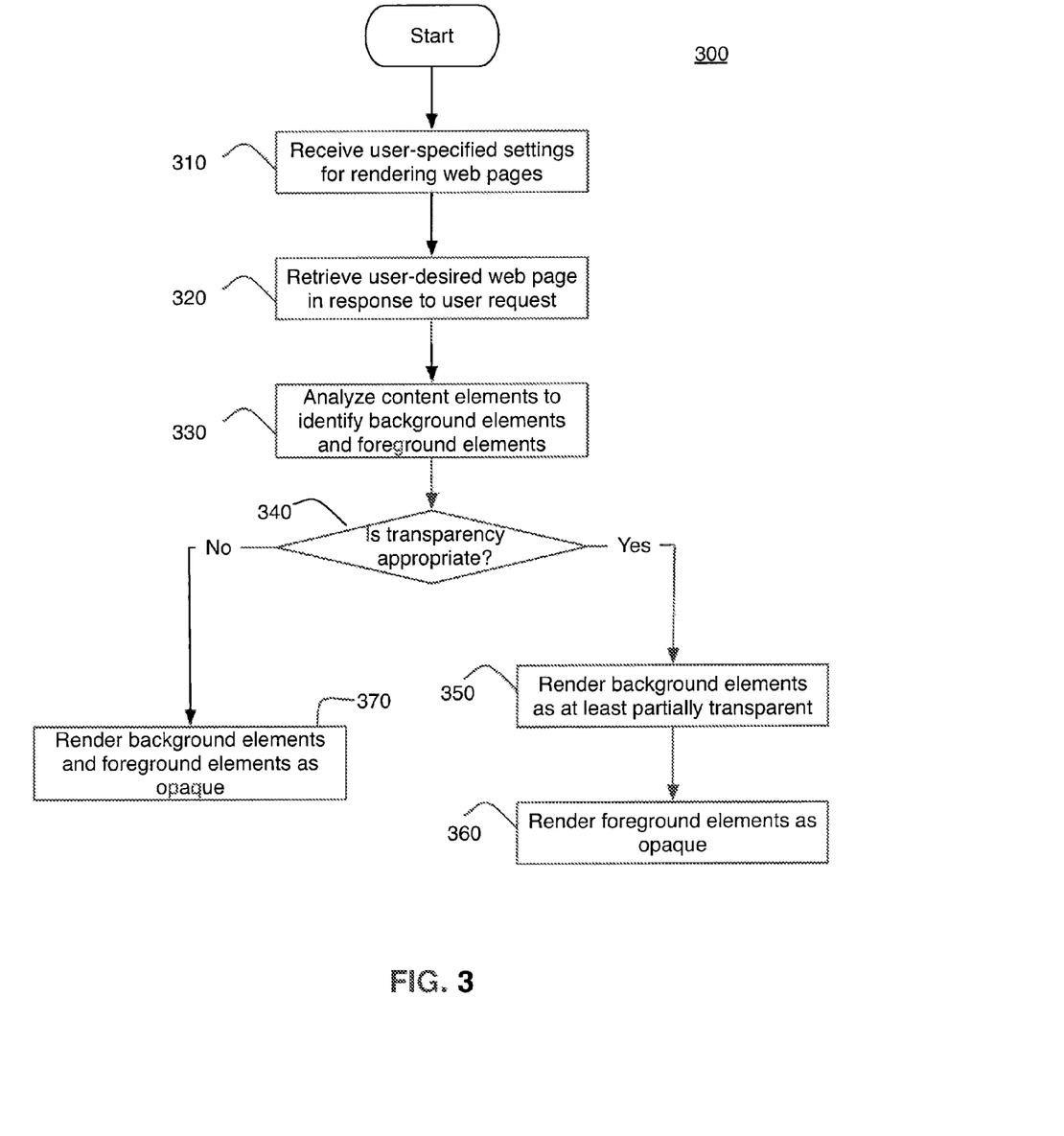
FIG. 3 is a flow diagram of a method in accordance with an embodiment.

FIG. 3 is a flow diagram of a method 300 for rendering a web page, in accordance with an embodiment. Method 300 may be implemented by a web browser executing on a computing device. Method 300 may also be implemented by a word processing application, spreadsheet application, presentation application, or other type of application executing on a computing device.

At block 310, one or more user-specified settings for rendering web pages are received. Such settings may include, for example, a desired level of opacity or transparency for rendering web pages or displaying documents or applications. Further, settings may include names, addresses, or categories of web sites or pages that should be rendered with partial transparency, and names, addresses, or categories of web sites or pages to render without transparency. Settings may also include characteristics or features of individual web pages to render with or without transparency. For example, a user may wish to have all images on a web page rendered with transparency. Settings may also include a desired level of opacity for an individual web site, document, or application.

At block 320, a user-desired web page is retrieved, in response to a user's request for the web page. For example, the user may select a bookmark in her browser to cause the web browser to retrieve the web page. Further, the user may enter a URL in an address bar of her browser to cause the web browser to retrieve the web page.

At block 330, content elements of the retrieved web page are analyzed to identify background elements and foreground elements of the retrieved web page. Content elements may be identified as background or foreground elements based on various characteristics, such as whether the element is a text, image, multimedia, or animation element. Further, content elements may be identified as background or foreground elements based on whether identical or similar elements appear on other web pages, or other characteristics. Such characteristics are explained in further detail below.

At decision block 340, a determination is made as to whether transparency is appropriate for background elements of the retrieved web page. The determination may be based on the analyzing performed at block 330. Transparency may not be appropriate for background elements of all web pages. For example, if the retrieved web page has a large area that displays video, transparency may not enhance the user's experience. Determining whether transparency is appropriate for background elements of a retrieved web page is explained further below.

If, at decision block 340, transparency is determined to be appropriate for background elements of the web page, method 300 proceeds to block 350. At block 350, identified background elements are rendered as at least partially transparent. In one embodiment, identified background elements are rendered as at least partially transparent according to the user-specified settings. For example, identified background elements may be rendered with 50% transparency, or another level of transparency. As an example, background elements, such as content elements 102A and 102_B, may appear as partially transparent as seen in FIG. 2C. A user may specify that background elements should be rendered as completely transparent. The user may also specify that background elements should be rendered as partially transparent unless her mouse pointer or cursor passes over the background element. Background elements may be rendered as transparent such that the user's desktop wallpaper is visible to the user through or beneath the background elements.

At block 360, identified foreground elements are rendered as opaque. Because foreground elements are likely to be interesting to the user, foreground elements may be rendered as opaque so that they may be readable or otherwise viewable. As an example, foreground elements, such as content elements 102_C and 102_D, may appear as opaque as seen in FIG. 2C.

If, at decision block 340, transparency is determined to be not appropriate for background elements of the web page, method 300 proceeds to block 370. At block 370, background elements and foreground elements of the web page are rendered as opaque. For example, the content elements of the web page are rendered as if the web browser did not have the capability to render web pages transparently. Thus, for example, the web browser window may appear according to the example of FIG. 2B.

In one embodiment, analyzing the one or more content elements of the web page may include analyzing the HTML layout of the web page. HTML tags and the structure of the HTML layout of the web page may provide indications as to whether certain elements of a web page are background elements or foreground elements. For example, the background image of a web page may be specified in a <body> tag. In accordance with an embodiment, the background image may be rendered as partially transparent.

In one embodiment, analyzing the one or more content elements of the web page to identify background elements and foreground elements of the web page may include analyzing the style sheet of the web page. Style sheets may be written in Cascading Style Sheets (CSS), and may describe the appearance and formatting of a web page. For example, style sheets may define the presentation of headlines, menus, images, borders, and other elements of a web page.

Style sheets are also integrally linked with HTML documents. For example, HTML documents may use <div> tags to divide a web page into various components that may be named. Based on the name of a <div> tag, a content element of a web page may be identified as either a background content element or foreground content element. For example, a content element having a <div> tag named "logo" or "menu" may be identified as a background element, while a content element having a <div> tag named "article" or "video" may be identified as a foreground element. Further, based on the style attributes assigned to a particular <div> tag, a determination may be made as to whether the content of the <div> tag is a background or foreground element.

Other HTML or CSS tags may also influence the determination of whether a content element is background or foreground. For example, content included by an <iframe> tag may be considered background content, as such content may not be directly part of a retrieved web page. Similarly, for a news article or other content, the amount of links on the web page, as compared to the amount of normal text in the content area may determine whether a particular content area is considered foreground or background.

In one embodiment, background content elements may be identified based on whether the content of the background content element is repeated on other web pages. For example, a web browser may compare the text of a background content element of a web page retrieved by the web browser to content that has been cached by the web browser. Based on this comparison, a block of text may be identified as a background element. Conversely, if a block of text, or an image, has not previously been seen by a web browser, the block of text may be identified as a foreground element.

In one embodiment, the determination at decision block 340 may be based on the user-specified settings. For example, the user may have a setting that indicates that a particular web site at www.example.org should not be rendered with transparency. Accordingly, based on this setting, method 300 may proceed to block 370, where the web site is rendered as opaque. Similarly, the user may have a setting that indicates that a particular web site at www.example.com should be rendered with transparency. Accordingly, based on this setting, method 300 may proceed to block 350, where the web site is rendered with partial transparency.

In one embodiment, the determination at decision block 340 may be based on a readability score for a web page rendered with partial transparency. For example, after analyzing the content of the web page to identify background and foreground elements, a web browser may determine a readability score of the web page if it were rendered with partial transparency. The readability score may be based on optical character recognition (OCR) techniques, edge detection, feature detection, user studies, or other factors. If the readability score satisfies a threshold, the web page may be rendered with partial transparency. If the readability score does not satisfy the threshold, the web page may be rendered as completely opaque. In one embodiment, different levels of transparency can be compared based on their readability scores, and the level of transparency with the best readability score may be selected for rendering the web page.

In a further embodiment, the readability score of the web page rendered with partial transparency may be based on a comparison with a rendering of the web page without partial transparency. For example and without limitation, if a rendering with partial transparency is 90% as readable as a rendering without transparency, then transparency may be determined to be appropriate for the particular web page.

In one embodiment, determining whether transparency is appropriate for a web page may be based on an analysis of pixels adjacent to content. For example, if the color of a desktop wallpaper image is too close to the color of a content element, that element may be identified as a foreground element and rendered without transparency.

In one embodiment, a particular web site provider, such as a corporation, may desire that its web page or web site not be rendered with transparency. Thus, instructions inserted into a web page, such as in a META tag of an HTML document, may instruct a web browser that transparency is not appropriate for the corporation's web page. In a further embodiment, a web browser may assume that transparency is appropriate for a web page unless otherwise instructed by an META tag, or other instructions.

In one embodiment, a provider of a web site may insert instructions, for example, HTML or CSS instructions, to control how individual elements of the provider's web site are rendered with transparency. For example, a web site provider may mark a particular content element as a background element rather than a foreground element. The web site provider may also specify that an element should be rendered as completely invisible if the page is rendered with partial transparency.

In one embodiment, the user may specify that a content element is a background element that should be rendered as transparent in the future. For example, on a given web page, a user may be able to instruct a web browser to render a content element as transparent by right clicking on the content element and selecting an option. The content element may be identified as a background element if the web page is retrieved at a later time.

In a further embodiment, a web browser may be configured to present a list of content elements of a web page to a user. The user may then be able to identify which elements are background elements and which elements are foreground elements. The web browser may use this information to appropriately render the web page with partial transparency. Further, the web browser may use this information to learn the user's preferences and identify background elements and foreground elements, and render the background elements as transparent.

Background elements and foreground elements may also be identified based on whether they are displayed using a web browser plug-in. For example, certain web browser plug-ins enable a web browser to display video or interactive content. Such content may always be identified as foreground elements, such that they are not rendered with transparency.

In one embodiment, to ensure that foreground elements are readable, one or more opaque contrast boxes may be rendered beneath the foreground elements. For example, if background elements, such as the background of a web page, are rendered as 100% transparent, a foreground content element containing black text on the web page may not be readable against a dark desktop wallpaper. Thus, a white or other colored contrast box may be rendered beneath the black text to allow readability of the black text. In one embodiment, instead of an opaque contrast box, text included in foreground elements may be presented with an outline font to make the text more readable against a similarly colored background.

In one embodiment, an opaque contrast box may also include the use of a blur filter. A blur filter may apply a blurry effect to a background image, which may soften edges in the background image. Softening the edges in a background image may reduce the background image's interference with foreground elements, which may make foreground elements rendered on top of the blur filter more readable.

In one embodiment, content elements of a web page may be identified as foreground elements based on their content type. For example, image content and video content may be identified as foreground elements, while text content may be identified as background elements. Further, a user may specify which content she would like to be rendered as transparent. For example, the user may specify that animation content should always be rendered as partially transparent.

In one embodiment, as described above, background elements of the web page may be rendered as transparent such that the user's desktop wallpaper can be seen beneath the transparent background elements. In a further embodiment, if other application windows are beneath the web browser window, the contents of those application windows may be seen beneath the transparent background elements.

Depending on the operating system of the computing device executing the application implementing method 300, the web page may be rendered using pseudo-transparency or true transparency. For example, in one embodiment, the operating system of the computing device may support true transparency. Accordingly, the web browser may instruct the operating system to render the web browser transparently, and the operating system may perform any necessary visual compositing or other effects to display the user's desktop wallpaper or application windows. In a further embodiment, the operating system of the computing device may not support true transparency. Accordingly, pseudo-transparency may be used to render the background elements as transparent. In such an embodiment, the web browser or other application may query the operating system of the computing device for the desktop wallpaper image, and perform any necessary visual compositing within the web browser to provide an illusion of transparency.

Figure 4:
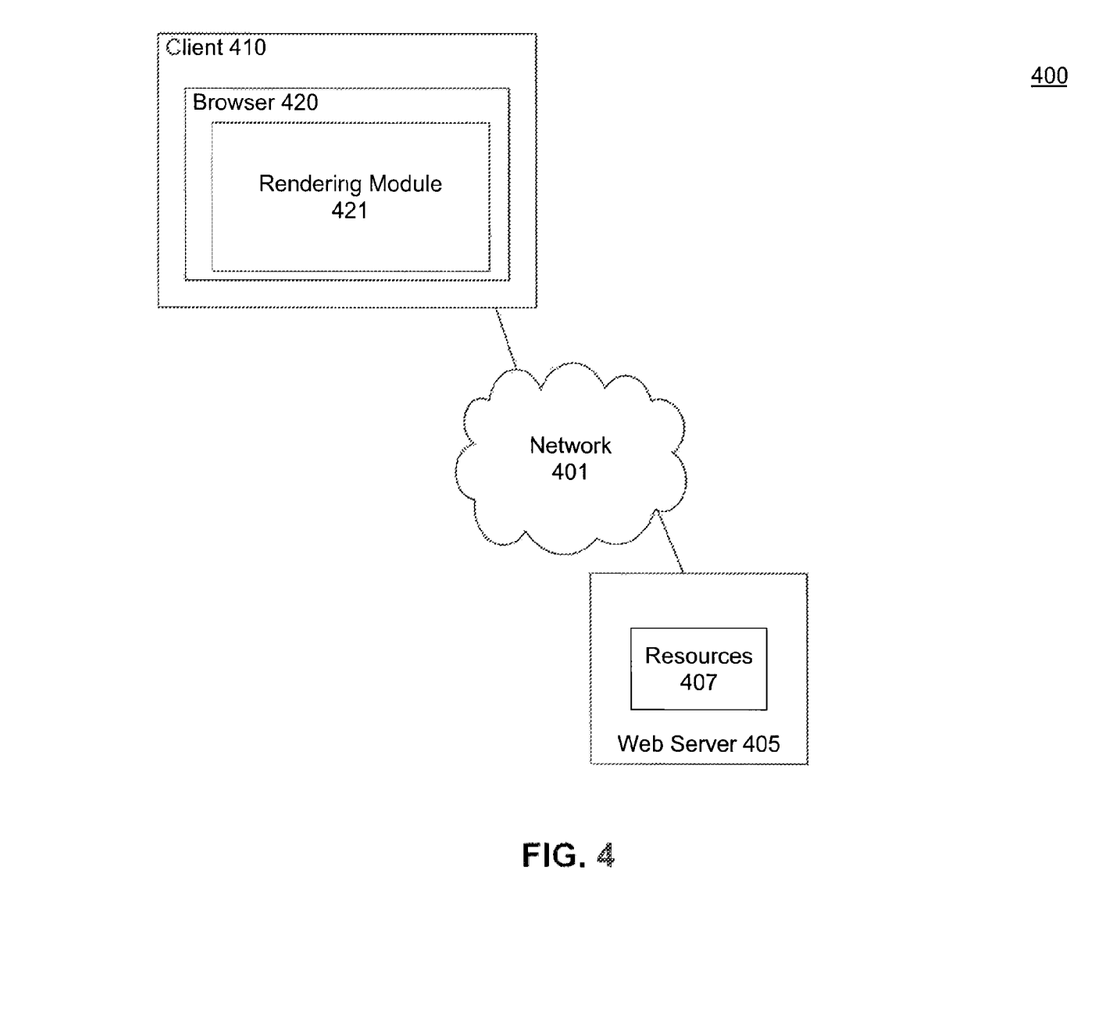
FIG. 4 is a diagram of a system in accordance with an embodiment.

FIG. 4 is an illustration of an example environment 400 in which embodiments may be implemented. Environment 400 includes client 410 and web server 405. The systems of environment 400 are connected via network 401, which may be a local area network or wide area network such as the Internet. Connections between the various systems of environment 400 and network 401 may be wired or wireless connections.

Client 410 may be, for example and without limitation, a device such as a desktop computer, laptop computer, mobile device, tablet computer, set top box, or other computing device configured to access resources through a network. Client 410 includes browser 420, which may be an application executed by a processing device of client 410. Browser 420 is configured to request and retrieve resources, such as web pages or web sites, over network 401. Browser 420 includes rendering module 421, which may render web pages with partial transparency, in accordance with method 300 of FIG. 3.

Web server 405 may be any computing device configured to accept requests for resources 407, such as web pages, and provide resources in response to the requests. Web server 405 may be implemented on a computing device or a group of computing devices. Further, web server 405 may be implemented on a distributed computing system.

Figure 5:
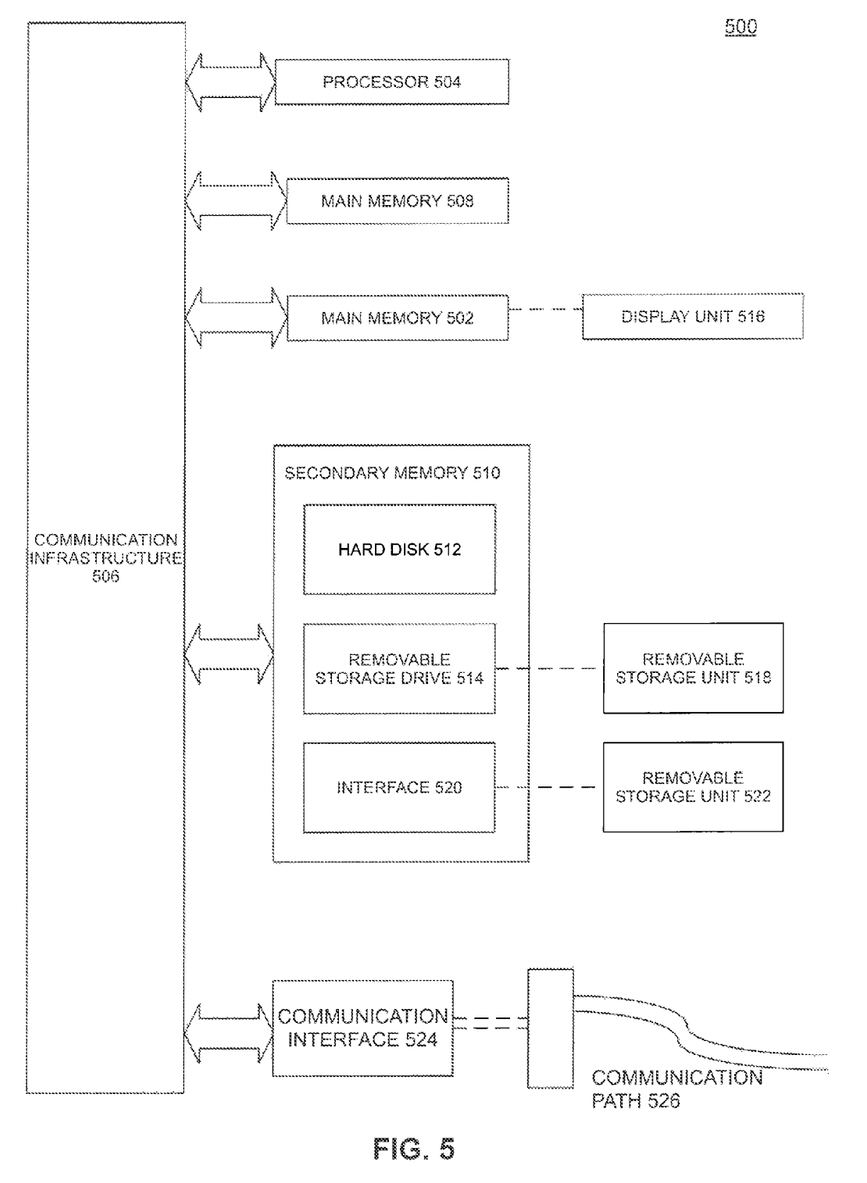
FIG. 5 is a system diagram that can be used to implement embodiments described herein.

FIG. 5 illustrates an example computer system 500 in which embodiments of the present invention, or portions thereof, may be implemented. For example, client 410 or web server 405 may be implemented in computer system 500 using hardware, software, firmware, tangible computer readable media having instructions stored thereon, or a combination thereof and may be implemented in one or more computer systems or other processing systems.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer-readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer-readable medium" are used to generally refer to media such as removable storage unit 518, removable storage unit 522, and a hard disk installed in hard disk drive 512. Computer program medium and computer-readable medium may also refer to memories, such as main memory 508 and secondary memory 510, which may be memory semiconductors (e.g. DRAMs, etc.).

Embodiments of the invention also may be directed to computer program products comprising software stored on any computer-readable medium. Such software, when executed in one or more data processing device, causes a data processing device(s) to operate as described herein. Embodiments of the invention employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the genera) concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method in a web browser, comprising:
   retrieving a user-desired web page in response to a user request for the web page;
   analyzing one or more content elements of the retrieved web page to identify one or more background elements of the web page and one or more foreground elements of the web page including determining a readability score of the retrieved web page that represents identified background elements rendered as at least partially transparent and identified foreground elements rendered as opaque;
   determining whether transparency is appropriate for background elements of the retrieved web page based on the analyzing, wherein the determining whether transparency is appropriate comprises determining whether the readability score satisfies a threshold;
   when it is determined that transparency is appropriate:
   rendering the identified background elements as at least partially transparent, such that a wallpaper is at least partially visible to a user through the identified background elements, and
   rendering the identified foreground elements as opaque; and
   when it is determined that transparency is not appropriate:
   rendering the identified background elements and identified foreground elements as opaque.

2. The method of claim 1, further comprising receiving one or more user-specified settings for rendering web pages, wherein rendering the identified background elements as at least partially transparent further comprises rendering the identified background elements as at least partially transparent according to the user-specified settings, and wherein rendering the identified foreground elements as opaque further comprises rendering the identified foreground elements as opaque according to the user-specified settings.

3. The method of claim 1, wherein analyzing one or more content elements of the web page further comprises analyzing the HTML layout of the web page.

4. The method of claim 1, wherein analyzing one or more content elements of the web page further comprises analyzing the style sheet of the web page.

5. The method of claim 1, further comprising:
   rendering one or more opaque contrast boxes; and
   rendering the identified foreground elements above the one or more opaque contrast boxes.

6. The method of claim 1, wherein receiving one or more user-specified settings comprises receiving one or more user-specified settings for rendering a particular web page, and
   wherein retrieving a user-desired web page comprises retrieving the particular web page.

7. The method of claim 1, wherein the identified foreground elements comprise one or more of image content, text content, video content, or animation content.

8. A system, comprising:
   a processor; and
   a web browser, implemented on the processor, configured to:
   retrieve a user-desired web page in response to a user request for the web page;
   analyze one or more content elements of the retrieved web page to identify one or more background elements of the web page and one or more foreground elements of the web page by determining a readability score of the retrieved web page that represents identified background elements rendered as at least partially transparent and identified foreground elements rendered as opaque;

determine whether transparency is appropriate for background elements of the retrieved web page based on the analyzing by determining whether the readability score satisfies a threshold;
when it is determined that transparency is appropriate:
render the identified background elements as at least partially transparent, such that a wallpaper is at least partially visible to a user through the identified background elements, and
render the identified foreground elements as opaque; and
when it is determined that transparency is not appropriate:
render the identified background elements and identified foreground elements as opaque.

9. The system of claim 8, wherein the web browser is further configured to receive one or more user-specified settings for rendering web pages, wherein rendering the identified background elements as at least partially transparent further comprises rendering the identified background elements as at least partially transparent according to the user-specified settings, and wherein rendering the identified foreground elements as opaque further comprises rendering the identified foreground elements as opaque according to the user-specified settings.

10. The system of claim 8, wherein the web browser is further configured to analyze one or more content elements of the web page by analyzing the HTML layout of the web page.

11. The system of claim 8, wherein the web browser is further configured to analyze one or more content elements of the web page by analyzing the style sheet of the web page.

12. The system of claim 8, wherein the web browser is further configured to:
render one or more opaque contrast boxes; and
render the identified foreground elements above the one or more opaque contrast boxes.

13. The system of claim 8, wherein the web browser is configured to receive one or more user-specified settings for rendering web pages including receiving one or more user-specified settings for rendering a particular web page, and
wherein the web browser is configured to retrieve a user-desired web page by retrieving the particular web page.

14. The system of claim 8, wherein the identified foreground elements comprise one or more of image content, text content, video content, or animation content.

15. A non-transitory computer readable storage medium having instructions stored thereon that, when executed by a processor, cause the processor to perform operations including:
retrieving a user-desired web page in response to a user request for the web page;
analyzing one or more content elements of the retrieved web page to identify one or more background elements of the web page and one or more foreground elements of the web page including determining a readability score of the retrieved web page that represents identified background elements rendered as at least partially transparent and identified foreground elements rendered as opaque;
determining whether transparency is appropriate for background elements of the retrieved web page based on the analyzing, wherein the determining whether transparency is appropriate comprises determining whether the readability score satisfies a threshold;
when it is determined that transparency is appropriate:
rendering the identified background elements as at least partially transparent, such that a wallpaper is at least partially visible to a user through the identified background elements, and
rendering the identified foreground elements as opaque; and
when it is determined that transparency is not appropriate:
rendering the identified background elements and identified foreground elements as opaque.

16. The non-transitory computer-readable storage medium of claim 15, the operations further including receiving one or more user-specified settings for rendering web pages, wherein rendering the identified background elements as at least partially transparent further comprises rendering the identified background elements as at least partially transparent according to the user-specified settings, and wherein rendering the identified foreground elements as opaque further comprises rendering the identified foreground elements as opaque according to the user-specified settings.

17. The non-transitory computer readable storage medium of claim 15, wherein analyzing one or more content elements of the web page further comprises analyzing the HTML layout of the web page.

18. The non-transitory computer readable storage medium of claim 15, wherein analyzing one or more content elements of the web page further comprises analyzing the style sheet of the web page.

19. The non-transitory computer readable storage medium of claim 15, the operations further comprising:
rendering one or more opaque contrast boxes; and
rendering the identified foreground elements above the one or more opaque contrast boxes.

20. The non-transitory computer readable storage medium of claim 16, wherein receiving one or more user-specified settings comprises receiving one or more user-specified settings for rendering a particular web page, and
wherein retrieving a user-desired web page comprises retrieving the particular web page.

21. The non-transitory computer readable storage medium of claim 15, wherein the identified foreground elements comprise one or more of image content, text content, video content, or animation content.

* * * * *